United States Patent
Tran

(10) Patent No.: US 9,672,044 B2
(45) Date of Patent: Jun. 6, 2017

(54) SPACE EFFICIENT CHECKPOINT FACILITY AND TECHNIQUE FOR PROCESSOR WITH INTEGRALLY INDEXED REGISTER MAPPING AND FREE-LIST ARRAYS

(75) Inventor: Thang M. Tran, Austin, TX (US)

(73) Assignee: NXP USA, INC., Austin, TX (US)

( * ) Notice: Subject to any disclaimer, the term of this patent is extended or adjusted under 35 U.S.C. 154(b) by 998 days.

(21) Appl. No.: 13/564,490

(22) Filed: Aug. 1, 2012

(65) Prior Publication Data

US 2014/0040595 A1 Feb. 6, 2014

(51) Int. Cl.
- G06F 9/312 (2006.01)
- G06F 9/30 (2006.01)
- G06F 15/76 (2006.01)
- G06F 9/38 (2006.01)

(52) U.S. Cl.
CPC .......... *G06F 9/384* (2013.01); *G06F 9/3836* (2013.01); *G06F 9/3842* (2013.01); *G06F 9/3857* (2013.01); *G06F 9/3863* (2013.01)

(58) Field of Classification Search
None
See application file for complete search history.

(56) References Cited

U.S. PATENT DOCUMENTS

| | | | |
|---|---|---|---|
| 5,463,745 A * | 10/1995 | Vidwans et al. | 712/218 |
| 5,630,149 A * | 5/1997 | Bluhm | 712/217 |
| 5,632,023 A * | 5/1997 | White | G06F 9/30094 712/215 |
| 5,644,742 A | 7/1997 | Shen et al. | |
| 5,649,136 A | 7/1997 | Shen et al. | |
| 5,651,124 A | 7/1997 | Shen et al. | |
| 5,651,125 A * | 7/1997 | Witt et al. | 712/218 |
| 5,655,115 A | 8/1997 | Shen et al. | |
| 5,659,721 A * | 8/1997 | Shen et al. | 712/228 |
| 5,673,408 A * | 9/1997 | Shebanow et al. | 712/216 |
| 5,673,426 A | 9/1997 | Shen et al. | |
| 5,872,949 A * | 2/1999 | Kikuta et al. | 712/216 |
| 5,946,468 A * | 8/1999 | Witt et al. | 712/218 |
| 5,951,670 A * | 9/1999 | Glew et al. | 712/23 |

(Continued)

OTHER PUBLICATIONS

'Register Renaming through Tomasulo's Algorithm and Remap Tables' by Prof. Nancy Warter-Perez, Apr. 28, 2005.*

(Continued)

*Primary Examiner* — Steven Snyder

(57) ABSTRACT

A processor may efficiently implement register renaming and checkpoint repair even in instruction set architectures with large numbers of wide (bit-width) registers by (i) renaming all destination operand register targets, (ii) implementing free list and architectural-to-physical mapping table as a combined array storage with unitary (or common) read, write and checkpoint pointer indexing and (iiii) storing checkpoints as snapshots of the mapping table, rather than of actual register contents. In this way, uniformity (and timing simplicity) of the decode pipeline may be accentuated and architectural-to-physical mappings (or allocable mappings) may be efficiently shuttled between free-list, reorder buffer and mapping table stores in correspondence with instruction dispatch and completion as well as checkpoint creation, retirement and restoration.

18 Claims, 8 Drawing Sheets

(56) References Cited

U.S. PATENT DOCUMENTS

| | | | | |
|---|---|---|---|---|
| 5,961,636 | A * | 10/1999 | Brooks | G06F 9/3863 |
| | | | | 712/222 |
| 6,073,231 | A * | 6/2000 | Bluhm et al. | 712/218 |
| 6,192,464 | B1 * | 2/2001 | Mittal | G06F 9/3017 |
| | | | | 712/200 |
| 6,357,016 | B1 * | 3/2002 | Rodgers | G06F 1/3203 |
| | | | | 712/E9.053 |
| 6,425,072 | B1 * | 7/2002 | Meier et al. | 712/218 |
| 6,957,323 | B2 | 10/2005 | Song | |
| 7,475,230 | B2 | 1/2009 | Chou et al. | |
| 7,571,304 | B2 | 8/2009 | Chaudhry et al. | |
| 9,182,986 | B2 * | 11/2015 | Rajwar | G06F 9/30145 |
| 2002/0116600 | A1 * | 8/2002 | Smith | G06F 9/3851 |
| | | | | 712/218 |
| 2003/0182538 | A1 * | 9/2003 | Gold | G06F 9/3836 |
| | | | | 712/217 |
| 2004/0255098 | A1 * | 12/2004 | Ogawa | G06F 9/3802 |
| | | | | 712/217 |
| 2005/0038980 | A1 * | 2/2005 | Rodgers | G06F 9/30152 |
| | | | | 712/220 |
| 2005/0251654 | A1 * | 11/2005 | Altman | G06F 9/30036 |
| | | | | 712/214 |
| 2009/0177868 | A1 * | 7/2009 | Lewis | G06F 9/3838 |
| | | | | 712/215 |
| 2012/0005444 | A1 * | 1/2012 | Rupley | G06F 9/384 |
| | | | | 711/166 |
| 2014/0089638 | A1 * | 3/2014 | Mylius | G06F 9/3017 |
| | | | | 712/208 |
| 2014/0365749 | A1 * | 12/2014 | Madduri | G06F 9/384 |
| | | | | 712/220 |
| 2015/0026437 | A1 * | 1/2015 | Achenbach | G06F 9/384 |
| | | | | 712/216 |
| 2015/0039860 | A1 * | 2/2015 | Sundar | G06F 9/30032 |
| | | | | 712/208 |
| 2016/0026463 | A1 * | 1/2016 | Sundar | G06F 9/384 |
| | | | | 712/208 |
| 2016/0092222 | A1 * | 3/2016 | Keppel | G06F 9/30185 |
| | | | | 712/228 |
| 2016/0179714 | A1 * | 6/2016 | Acharya | G06F 12/023 |
| | | | | 711/158 |

OTHER PUBLICATIONS

'Register File Optimizations for Superscalar Microprocessors' Dissertation by Oguz Ergin, M.S., State University of New York at Binghamton, 2003, B.S., Middle East Technical University, Ankara, Turkey 2000.*

Wikipedia's article on 'Circular buffer' archived from Jun. 22, 2012.*

'HASE Tomasulo's Algorithm Website' at http://www.icsa.informatics.ed.ac.uk/research/groups/hase/projects/tomasulo/index.html HASE Project, Institute for Computing Systems Architecture, School of Informatics, University of Edinburgh, Last change Feb. 28, 2003.*

'Checkpoint Repair for High-Performance Out-of-Order Execution Machines' by Wen-Mei W. Hwu and Yale N. Patt, IEEE Transactions on Computers, vol. C-36 No. 12, Dec. 1987.*

'Dynamic Register Renaming Through Virtual-Physical Registers' by Teresa Monreal et al., The Journal of Instruction Level Parallelism, vol. 2, May 2000.*

'Register Renaming and Dynamic Speculation: an Alternative Approach' by Mayan Moudgill et al., copyright 1993, IEEE.*

Akkary et al. "Checkpoint Processing and Recovery: Towards Scalable Large Instruction Window Processors." Microprocessor Research Labs, Intel Corporation. Proceedings of the 36th International Symposium on Microarchitecture. IEEE. 2003.12 pgs.

U.S. Appl. No. 13/094,110, filed Apr. 26, 2011.

* cited by examiner

SPACE EFFICIENT CHECKPOINT FACILITY AND TECHNIQUE FOR PROCESSOR WITH INTEGRALLY INDEXED REGISTER MAPPING AND FREE-LIST ARRAYS

BACKGROUND

Field of the Invention

This disclosure relates to management of register storage in a processor and, more particularly, to structures and techniques for register storage management in processors that support speculative execution and register renaming.

Description of the Related Art

Register renaming is a technique commonly employed in advanced computer processor designs to avoid unnecessary serialization of program operations that might otherwise be required by resource dependencies that result from contention for, and reuse of, registers allocated to a program (e.g., by a compiler or execution environment) rather than true producer-consumer, data dependencies. By providing facilities to rename (or map) the generally smaller number of registers that are defined by an instruction set architecture (ISA) to a generally larger number of physical registers implemented in a particular realization of that ISA, it is often possible to execute some instructions of a program-order sequence of instructions in parallel and, in many cases, to complete instructions that would otherwise have to wait for their program-specified, architectural register destination target to be available. In this way, and using multiple execution units, modern computer processors can provide improved performance and throughput.

Speculative execution is another technique that is commonly employed in advanced computer processor designs to improve performance and throughput. By dispatching and executing instructions ahead of (i.e., speculatively with respect to) results or states to which a program sequence of instructions are not yet committed, a processor and computation can often make progress. If the speculative states on which speculatively executed sequence of instructions relies turn out to be correct, such as in a correctly predict branch, and if roll-back costs of being wrong are statistically tolerable, speculative execution can provide performance and throughput benefits. Checkpoint repair is one approach to managing roll-back.

Mechanisms for implementing register renaming and speculative execution in advanced computer processors can be complex and of varied design, particularly when out-of-order execution and exception handling are considered. Increased counts of architectural and physical registers, increased levels of instruction parallelism and numbers of instructions in flight at any given time, and increased register widths in modern microprocessors and processor cores all complicate the design trade-offs and challenges.

Improved designs and implementations are desired.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DESCRIPTION

It has been discovered that a processor may efficiently implement register renaming and checkpoint repair even in instruction set architectures with large numbers of wide (bit-width) registers by (i) renaming all destination operand register targets, (ii) implementing free list and architectural-to-physical mapping table as a combined array storage with unitary (or common) read, write and checkpoint pointer indexing and (iiii) storing checkpoints as snapshots of the mapping table, rather than of actual register contents. In this way, uniformity (and timing simplicity) of the decode pipeline may be accentuated and architectural-to-physical mappings (or allocable mappings) may be efficiently shuttled between free-list, reorder buffer and mapping table stores in correspondence with instruction dispatch and completion as well as checkpoint creation, retirement and restoration.

For concreteness, the description focuses on an exemplary implementation of an illustrative instruction set architecture, of illustrative instruction decode, dispatch and execution pipelines that support out-of-order completion of instructions dispatched in program order, and of certain illustrative speculative execution constructs such as checkpoint repair. Of course, techniques described herein may have broader applicability to other instruction set architectures and in other processor designs that support other mechanisms for exploiting instruction level parallelism, but will be understood and appreciated by persons of ordinary skill in the art based on the illustrated context.

Accordingly, in view of the foregoing and without limitation on instruction set design, underlying processor or system architectures and mechanisms instruction level parallelism that may be employed in embodiments of the present invention, we describe certain illustrative embodiments.

Processors and Register Renaming, Generally

Figure 1:
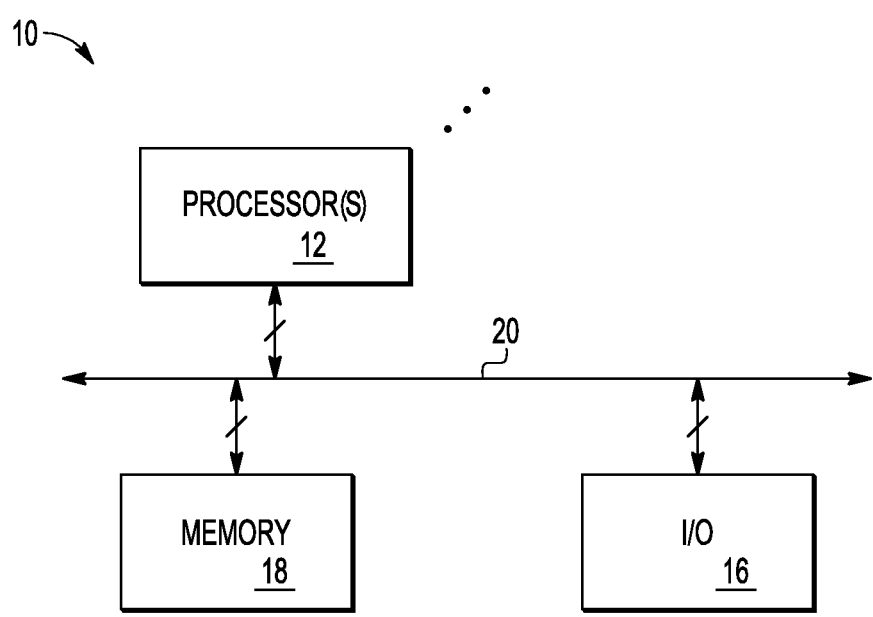
FIG. 1 is a block diagram of a data processing system that includes a processor that manages a mapping between architectural and physical registers in accordance with one or more embodiments of the present invention(s).

FIG. 1 illustrates a data processing system 10 consistent with some embodiments of the invention(s). In general, data processing system 10 may be implemented on a single integrated circuit or on a plurality of integrated circuits. In some cases, data processing system 10 may be implemented as a system-on-chip. In the illustrated configuration, data processing system 10 includes processor(s) 12, I/O module 16, and memory 18. Components of data processing system 10 are interconnected and interoperate using any suitable techniques. For simplicity, interconnection amongst major functional blocks is illustrated via bus 20, although persons of ordinary skill in the art will recognize that any of a variety of interconnection techniques and topologies may be employed without departing from the present invention.

Typically, implementations of processor(s) 12 include fetch buffers or other facilities for storing instructions to be executed by the processor(s), decoder and sequencing logic, one or more execution units, and register storage, together with suitable data, instruction and control paths. At any given time, consistent with a computation performed by processor(s) 12, units of program code (e.g., instructions) and data reside in memory 18, in one or more levels of cache(s) and/or in processor stores (such as a fetch buffer, registers, etc.) In general, any of a variety of memory hierarchies may be employed, including designs that separate or commingle instructions and data in memory or cache. Memory 18 (or any portion thereof) may be located on the same integrated circuit as a processor, may be located on a different integrated circuit than processor(s) 12 or may span multiple integrated circuits. In addition, memory 18 may include storage of any suitable type, such as, for example, read only memory (ROM), random access memory (RAM), non-volatile memory (e.g., Flash), etc.

Figure 2:
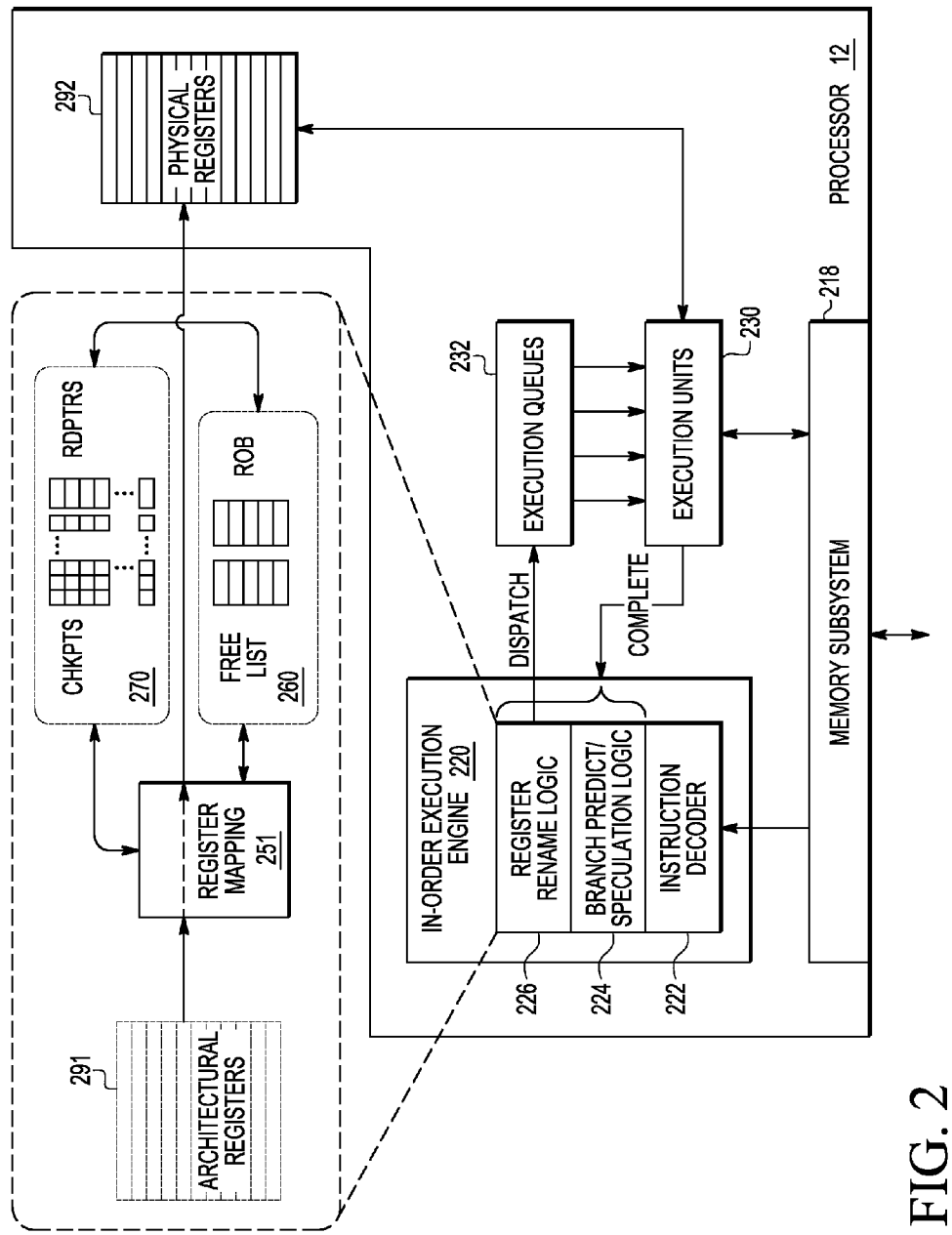
FIG. 2 is a block diagram that illustrates data and control flows amongst major functional blocks of an instruction processing pipeline operative during decode stage operations in a processor in accordance with one or more embodiments of the present invention(s).

FIG. 2 is a block diagram of a processor instance corresponding to processor(s) 12 of data processing system 10 (see FIG. 1), now referred to as processor 12. An in-order execution engine 220 of processor 12 provides in-order dispatch of program instructions to a plurality of execution units 230. In general, instructions may be dispatched speculatively, and in-order, but may complete out-of-order in the absence of data dependencies. Instruction decoder 222 obtains processor instructions from suitable stores (e.g., an instruction buffer, instruction cache, etc. shown generally as processor portion 218 of a memory subsystem) which in turn obtain program sequences of instructions from and, as necessary or desirable, manage coherence with off-processor portions the memory subsystem. Persons of ordinary skill in the art will appreciate a variety of suitable implementations and variations on instruction decode logic. Branch prediction/speculation logic 224 facilitates speculative execution of program instructions using any of a variety of techniques and in accord with a checkpoint repair model of rollback.

As with instruction decode logic, persons of ordinary skill in the art will appreciate a variety of suitable implementations and variations on branch prediction/checkpoint logic. However, while instruction decoder 222 and the techniques for identification and resolution of speculation in branch prediction/speculation logic 224 may (in some cases) be of largely conventional design, interaction of such instruction decode and speculation logic with free list, reorder buffer and/or checkpoint facilities of register rename logic 226 are generally unconventional and will be understood based on the description that follows. Note that decomposition of logic and/or functionality into distinct instruction decode, branch predict/checkpoint and register renaming portions (as shown in FIG. 2) is somewhat arbitrary and, based on the description herein, persons of ordinary skill in the art will understand such decomposition is for descriptive purposes only. Indeed, implementations in accord with some embodiments of the present invention(s) may integrate or commingle aspects of circuits and structures that, for purposes of descriptive focus and clarity, are separately described herein.

In view of the foregoing and without limitation, register rename logic 226 provides in-order execution engine 220 with a mechanism for run-time mapping of architectural register identifiers (for source and destination operands of successively decoded instructions) to corresponding ones of the actual physical registers implemented by processor 12. Thus, for successively dispatched instructions, the operative mapping from architectural register identifiers to actual physical registers 292 provided by register map 251 is both used and updated by register rename logic 226.

More specifically, architectural register identifiers for one or more source operands of an instruction dispatched (e.g., via execution queues 232) are replaced (for execution by a respective one of execution units 230) with current mapping targets retrieved from register map 251. Each destination operand generates a new physical register renaming target of the specified architectural register identifier, which is in turn stored in register map 251 as the current mapping for use (as a source operand mapping) by successive instructions dispatched in program order. Thus, for a program sequence of instructions that includes (as follows):

ADD AR3, AR1, AR2
ADD AR3, AR3, AR4 successive instructions (e.g., arithmetic add instructions) specifying for source operands, architectural registers (AR1, AR2 and AR3, AR4, respectively) and for destination operands, a same architectural register (AR3), register rename logic 226 retrieves then current source operand register mappings from register map 251 and establishes new destination operand register mappings for dispatch to respective execution units 230. Note that architectural register AR3 is both a source and a destination operand in the second instruction.

Thus, if architectural registers AR1, AR2 and AR4 are respectively mapped to physical registers PR21, PR22 and PR24 and physical registers PR34 and PR35 are each available (from a free pool of physical registers), the instructions may be dispatched by in-order execution engine 220 as follows:

ADD PR34, PR21, PR22
ADD PR35, PR34, PR24

To efficiently manage a free list of physical registers available for use in new renamings and to allow direct retirement to the free list of physical registers involved in prior renamings (and/or recovered after misspeculation, e.g., after branch mispredicts or based on an exception), a coordinated free list/reorder buffer (ROB) store 260 is provided. In some embodiments detailed further herein, free list/ROB store 260 is implemented as a circular buffer of entries each having a free list field, a register reorder buffer field and a completed field (or bit). Likewise, to efficiently manage repair or rollback to a checkpointed state of register mapping 251 after a recovered-from misspeculation, a checkpoint image store 270 is provided in which a plurality of successive checkpoints are storable (e.g., represented as checkpointed register mapping 251 state and corresponding checkpointed read pointer state for indexing into free list/ROB store 260). Implementations of checkpoint image store 270 are likewise detailed further herein.

Figure 3:
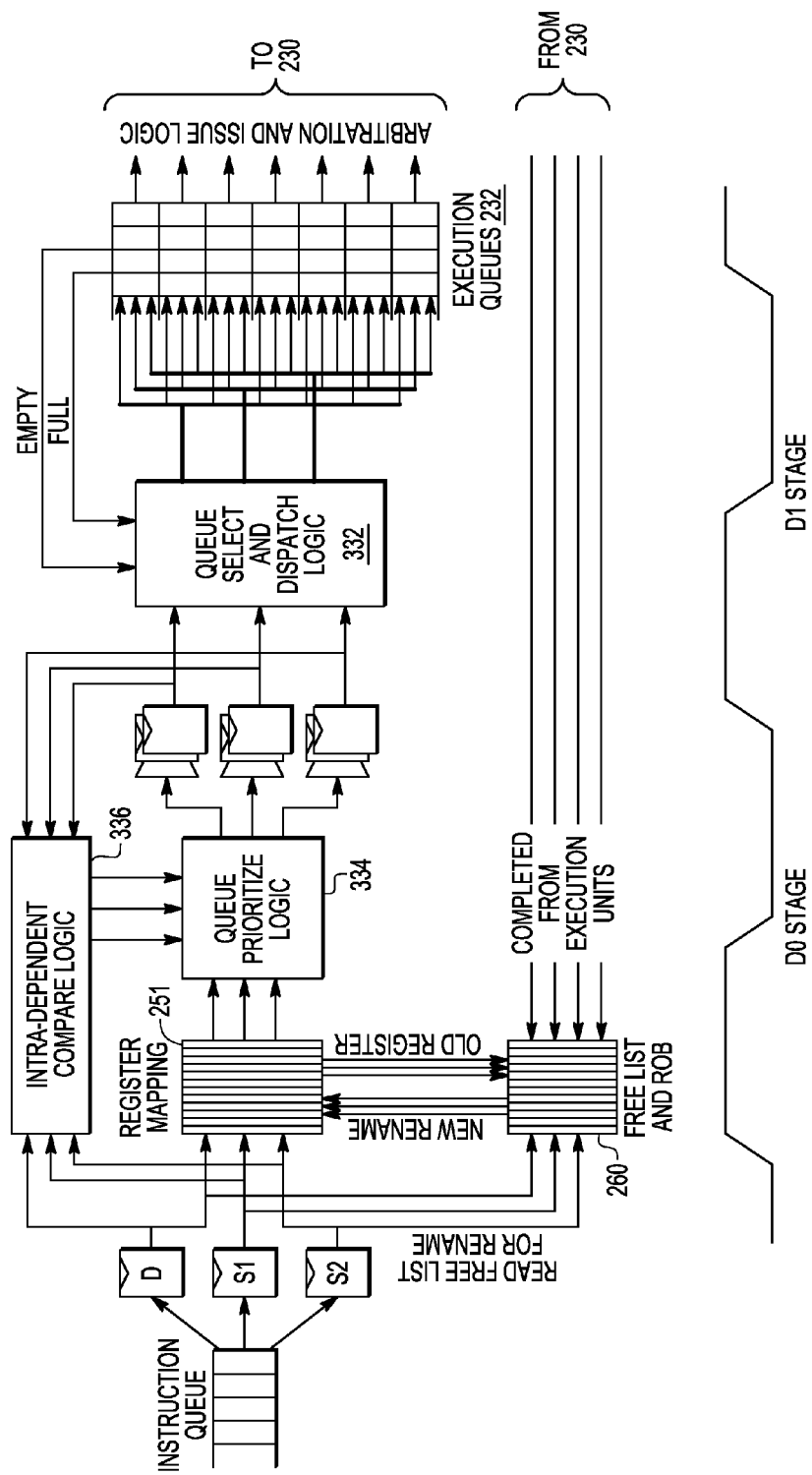
FIG. 3 is a block diagram that illustrates data and control flows into and out of an architectural-to-physical register mapping table used by register renaming logic and checkpoint logic of a processor in accordance with one or more embodiments of the present invention(s).

Mechanism(s) for Efficiently Maintaining Free List/ROB in Correspondence with Renaming State FIG. 3 illustrates, in further detail, data and control flows into and out of a register mapping store 251 used by register renaming logic and checkpoint logic (recall FIG. 2) of a processor in accordance with some embodiments of the present invention(s). More specifically, decode stage (D0) representations of instructions include architectural register identifiers for a destination operand register (D) and for two source operands (S1, S2) for which lookups in register mapping store 251 are performed. For source operand register identifiers, currently mapped physical register identifiers are retrieved from store 351 and supplied as physical register targets to queue select and dispatch logic 332 via prioritization logic 334 and based on instruction dependency comparison logic 336. At the same time, a new renaming is generated for the architectural register identifier used as a destination operand.

In particular, an available new renaming target is obtained from a free list field of a next entry in integrated free list/ROB store 260, while the existing renaming target for the architectural register decoded as the destination operand is stored to the reorder buffer (ROB) field of the same entry. The newly renamed physical register target is supplied as the destination operand physical register target (together with previously described source operand renamings) to queue select and dispatch logic 332 for dispatch to execution queues 232 and eventual execution on a respective one of the previously described execution units 230 (recall FIG. 2). As previously explained, a new renaming is generated each time an architectural register identifier is used as a destination operand without regard to actual, in-flight, data dependencies. This approach tends to simplify the implementation and timing, thereby facilitating (in at least some processor integrated circuit implementations and designs) increased clock speeds with high throughput, in part, by allowing for uniform pipeline staging through decode.

Although instructions may be completed out-of-order by execution units, because instructions are dispatched and retired to architectural register state in program-order, retirement of a checkpoint set of instructions (and ROB fields of corresponding entries in free list/ROB store 260) necessarily indicates that prior renaming targets (i.e., physical register identifiers stored in such ROB fields) may be returned to the associated free list entry. These and other aspects of an illustrative circular buffer implementation are now described in greater detail with reference to FIG. 4.

Figure 4:
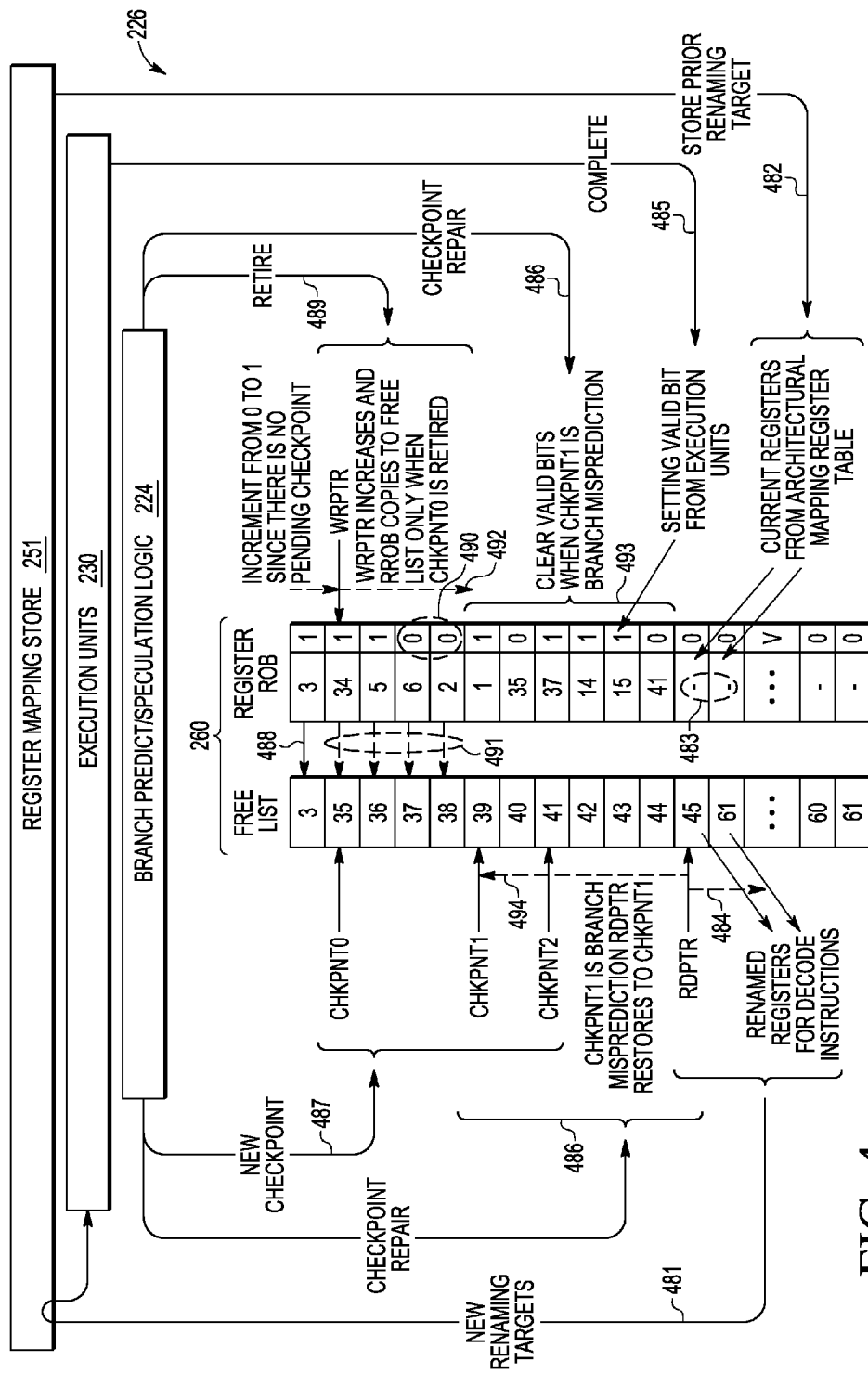
FIG. 4 is a block diagram that illustrates indexing into, and usage of, free-list and register reorder buffer fields of a circular buffer used by renaming logic of a processor in accordance with one or more embodiments of the present invention(s).

FIG. 4 is a block and information flows diagram that illustrates indexing into, and usage of, free-list and register reorder buffer fields of a circular buffer used by renaming logic of a processor in accordance with one or more embodiments of the present invention(s). As such, FIG. 4 illustrates manipulations performed by, or in coordination with, register renaming logic 226 (recall FIG. 2) relative to free list/ROB store 260, register mapping store 251, execution units 230 and branch prediction/speculation logic 224. An exemplary state of integrated free list/ROB store 260 is illustrated together with state changes that may be expected (1) as additional instructions are decoded and dispatched, (2) as instructions complete, (3) as new checkpoints are established, (4) as checkpoints are retired, and (5) as checkpoint repair is performed (e.g., in response to a branch mispredict or precise exception). For purposes of descriptive clarity, interactions are illustrated and described relative to register renaming logic, execution units and branch predict/speculation logic portions of a processor (recall FIG. 2). Nonetheless, it will be appreciated that while the functional decomposition into illustratively separate renaming, branch prediction and speculation blocks can provide a useful descriptive context, corresponding logic and circuit realizations may (as a practical matter) tend to integrate these aspects in a given implementation. In view of the foregoing, and without limitation, certain illustrative interactions with free list/ROB store 260 state are now described.

Turning first to renaming operations in connection with instruction dispatch, register renaming logic 226 (not separately shown, but recall FIG. 2) obtains (481) from free list field entries of free list/ROB store 260 new physical register renaming for destination operand targets and stores (482) prior renaming targets (for the same architectural registers) to corresponding ROB field entries of free list/ROB store 260. A new physical register renaming target obtained from the free-list is used to update the architectural-to-physical register mapping store 251 for the mapped from architectural register and is supplied to execution units as the destination operand physical register identifier. FIG. 4 illustrates an identifier for a free physical register (physical register identifier 45) being obtained as a new destination operand renaming target (for a given instruction) from the free list field of an entry of free list/ROB store 260 identified by read pointer RDPTR. FIG. 4 also illustrates a second identifier (physical register identifier 61) being obtained as the destination operand renaming for a next instruction in program order. In correspondence with the successive new renamings (using physical register identifiers 45 and 61, respectively) prior renaming targets from register mapping store 251 for the same architectural registers are stored (482) in ROB fields (483) of corresponding entries of free list/ROB store 260 and RDPTR is correspondingly advanced (484) to identify an updated head-end of the circular buffer implementation of integrated free list/ROB store 260.

Turning next to instruction completions, in correspondence with program execution, completion indications from execution units 230 are used to update (e.g., set) a completion indication for the free list/ROB store 260 entry that corresponds to the completed instruction. Thus, in the illustration of FIG. 4, a completion signal supplied (485) based on completion of a particular instruction at a corresponding one of the execution units 230 is used to set a completion bit for the corresponding free list/ROB store 260 entry. Specifically, completion (485) sets the completion bit for the entry that shows physical register identifier 15 as the prior renaming target for the architectural register destination that (on renaming/dispatch) was renamed to map physical register identifier 43 as the destination operand target. Accordingly, upon subsequent retirement of the instruction (or in the checkpoint repair implementation further detailed below and upon retirement of a set of instructions corresponding to a checkpoint), the prior renaming of the architectural register destination operand (here, physical register 15) may be retired.

Although certain aspects of the operation and use of integrated free list/ROB store 260 will be understood without regard to a checkpoint repair salutation, we now turn with greater specificity to interplay with a particular checkpoint and repair architecture and implementation as detailed herein.

Mechanism for Efficiently Maintaining Checkpoints and Repairing Renaming State

In general, certain instructions executed by a processor may signify (or be treated as) a checkpoint. For example, in the illustration of FIG. 4, for a processor (such as processor 12, recall FIG. 1) in which the circular buffer implementation of integrated free list/ROB store 260 is provided, instructions dispatched with destination operand renaming targets (i.e., physical register identifiers 35, 39 and 41) obtained from corresponding entries of the free-list that were (at time of renaming/dispatch) at a then head-end of free list/ROB store 260 (as identified by a then-current of the read pointer) will be understood to correspond to checkpoints (i.e., checkpoints CHKPNT0, CHKPNT1 and CHKPNT2, respectively). Note that in some processor ISAs or situations, new checkpoints may be established (487) by execution of a checkpoint instruction. Likewise, in some processor implementations or situations, checkpoints may be established (487) in correspondence with a branch (or other control transfer) speculatively executed by the processor. Description which follows (relative to FIG. 5) explains other checkpoint facilities in greater detail; however, checkpoint repair and checkpoint retirement operations on free list/ROB store 260 state will be understood relative to FIG. 4.

Focusing initially then on the illustration of FIG. 4, it will be understood that checkpoint sets of instructions may be retired once speculation (if any) has been resolved and constituent instructions of a given checkpoint (and any preceding checkpoints) have been completed. Thus, in the illustrated situation, dispatched instructions that correspond to free list/ROB store 260 entries that precede checkpoint CHKPNT0 have no unresolved speculation (i.e., there are no pending prior checkpoints). Accordingly, prior renamings (i.e., physical register mappings) of destination operand targets for instructions preceding checkpoint CHKPNT0 may be retired and identifiers for the previously mapped-to physical registers (e.g., physical register identifier 3 stored in the corresponding ROB entry) has been returned (488) to the corresponding free list entry. Consistent with retirement of checkpoints prior to checkpoint CHKPNT0, a writer pointer WRPTR marks the tail-end of the circular buffer representation. Likewise, once checkpoint CHKPNT0 speculation has been resolved, branch predict/checkpoint logic 224 may indicate (489) that checkpoint CHKPNT0 instructions (i.e., those dispatched instructions corresponding to free list/ROB store 260 entries between checkpoint CHKPNT0 and checkpoint CHKPNT1) and prior renamings of corresponding destination operand targets are eligible to be retired once each of the constituent instructions of the checkpoint set is completed (see preceding discussion of completion indications from execution units 230). Thus, once the remaining two completions (see valid bits 490) are indicated, instructions of the checkpoint CHKPNT0 set (together with prior renamings of the corresponding destination operand targets) may be retired, physical register identifiers 34, 5, 6 and 2 may be returned (491) to the free list, and the write pointer WRPTR may be advanced to align the tail-end of the circular buffer with the next checkpoint (checkpoint CHKPNT1).

Of course, in some cases, speculation is resolved unfavorably (e.g., in the case of a branch mispredict or an intervening exception or interrupt). In such cases, a checkpoint repair is processed whereby register mapping state, including states represented in entries of free list/ROB store 260, is rolled back a prior checkpoint. For example, in the illustration of FIG. 4, a checkpoint repair (486) indication received for checkpoint CHKPNT1 (with the read pointer RDPTR state indicated), would result in a rollback of six (6) dispatched instructions in various states of completion (i.e., the instructions that were provided with physical register identifiers 39, 40, 41, 42, 43 and 44 from the free list as renamed destination operands. Additional aspects of checkpoint repair are explained relative to FIG. 5 which follows; however, relative to the illustration of FIG. 4 and checkpoint repair event 486, completion bits are cleared (493) and read pointer state is restored (494) so as to coincide with the checkpoint CHKPNT1 index into free list/ROB store 260.

Figure 5:
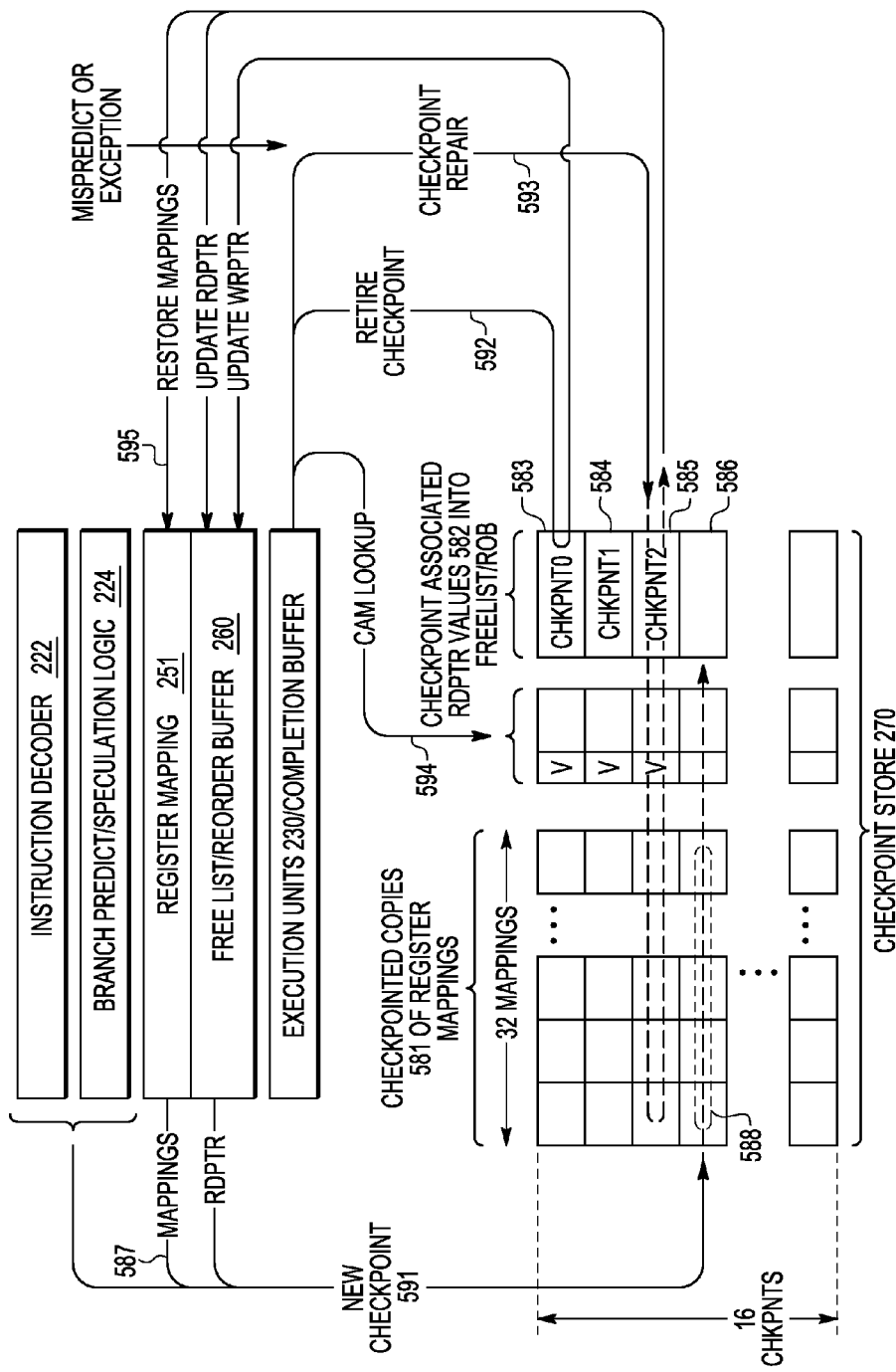
FIG. 5 is a block diagram that illustrates indexing into, and usage of, checkpoint entries used to coordinate checkpoint and renaming state in correspondence with checkpoint creation, retirement and repair operations of a processor in accordance with one or more embodiments of the present invention(s).

Turning now to FIG. 5, additional aspects of checkpoint creation and repair are illustrated relative to checkpoint image store 270 (recall FIG. 2). More specifically, FIG. 5 illustrates a checkpoint image store 270 implemented as a buffer for storage of copies (581) made, in correspondence with checkpoints, of then-current architectural-to-physical register mappings from register mapping store 251. For example, in an implementation of a processor 12 instruction set architecture (ISA) that provides 32 architecturally-defined registers and 128 physical registers suitable for use in renaming, the copies (581) of architectural-to-physical register mappings that are stored to checkpoint image store 270 may include the 32, 7-bit physical register identifiers that code encode a then-current renaming state. Together with each respective checkpointed copy of register mappings, a then-current value of read pointer RDPTR into free list/ROB store 260 is also stored as a checkpoint identifying index into free list/ROB store 260. Note that, in general, new checkpoint 591 may be taken based on a checkpoint instruction identified by instruction decoder 222, based a speculation point (e.g., a branch prediction) noted by branch prediction/speculation logic 224 in an execution sequence of instructions, or in response to an analogous condition or event particular to a checkpointing framework employed by a given processor implementation.

Read in conjunction with the illustration of FIG. 4, it will be understood that notation of checkpoints (i.e., checkpoints CHKPNT0, CHKPNT1 and CHKPNT2, previously described) may be accomplished by storing as an index for later use then-current values (582) of read pointer RDPTR into free list/ROB store 260. Specifically, indices into free list/ROB store 260 corresponding to checkpoints CHKPNT0, CHKPNT1 and CHKPNT2 are stored in fields 583, 584 and 585 of checkpoint image store 270 based on checkpoints previously taken. New checkpoint 591, in turn, causes a current read pointer RDPTR index into free list/ROB store 260 to be stored in field 586, together with a copy of current mappings 587 into fields 588 of checkpoint image store 270.

In this way, only current mappings and RDPTR index, and not current register values themselves or reorder buffer or free list state need be stored upon taking of a new checkpoint 591. Because storage requirements for such an implementation of checkpoint image store 270 scale in relation to the generally smaller number of architectural registers (e.g., 32) rather than the generally larger number of physical registers (e.g., 128) and in relation to register identifier width (e.g., 7-bits) rather than register data width (e.g., 64-bits), processor implementations in accordance with some embodiments of the present invention(s) may allow for substantial pipeline depth and reorder buffer depth without significant scaling impact on checkpoint image store 270. In some cases, this reduced scaling impact on physical structures may make checkpoint repair a viable speculation recovery technique in processor instruction set architectures for which it (or related techniques) have heretofore been impractical or undesirable.

Like creation of a new checkpoint (591), retirement (592) and repair (593) of checkpoints previously taken will be understood by reading FIG. 5 in conjunction with the illustration of FIG. 4. More specifically, upon conditions that (for a given ISA) trigger retirement of instructions prior to a given checkpoint (e.g., retirement 592 of checkpoint CHKPNT0), the associated and previously stored value of read pointer RDPTR index into free list/ROB store 260 is retrieved and used to advance the current write pointer WRPTR thereinto. To identify the relevant entries in checkpoint image store 270, a checkpoint identifier obtained from the completion buffer is used for lookup (594), e.g., using content addressable memory (CAM) techniques. Likewise, upon conditions that (for a given ISA) trigger rollback or repair to a given checkpoint (e.g., checkpoint repair 593 to checkpoint CHKPNT2), the associated and previously stored value of read pointer RDPTR index into free list/ROB store 260 is retrieved and used to repair/rollback the current read pointer RDPTR to the retrieved value. Coincident with the repair/rollback, the corresponding copy (from 581) of register mappings that were current at the checkpoint (here checkpoint CHKPNT2) is used to restore (595) to register mapping store 251.

Figure 6:
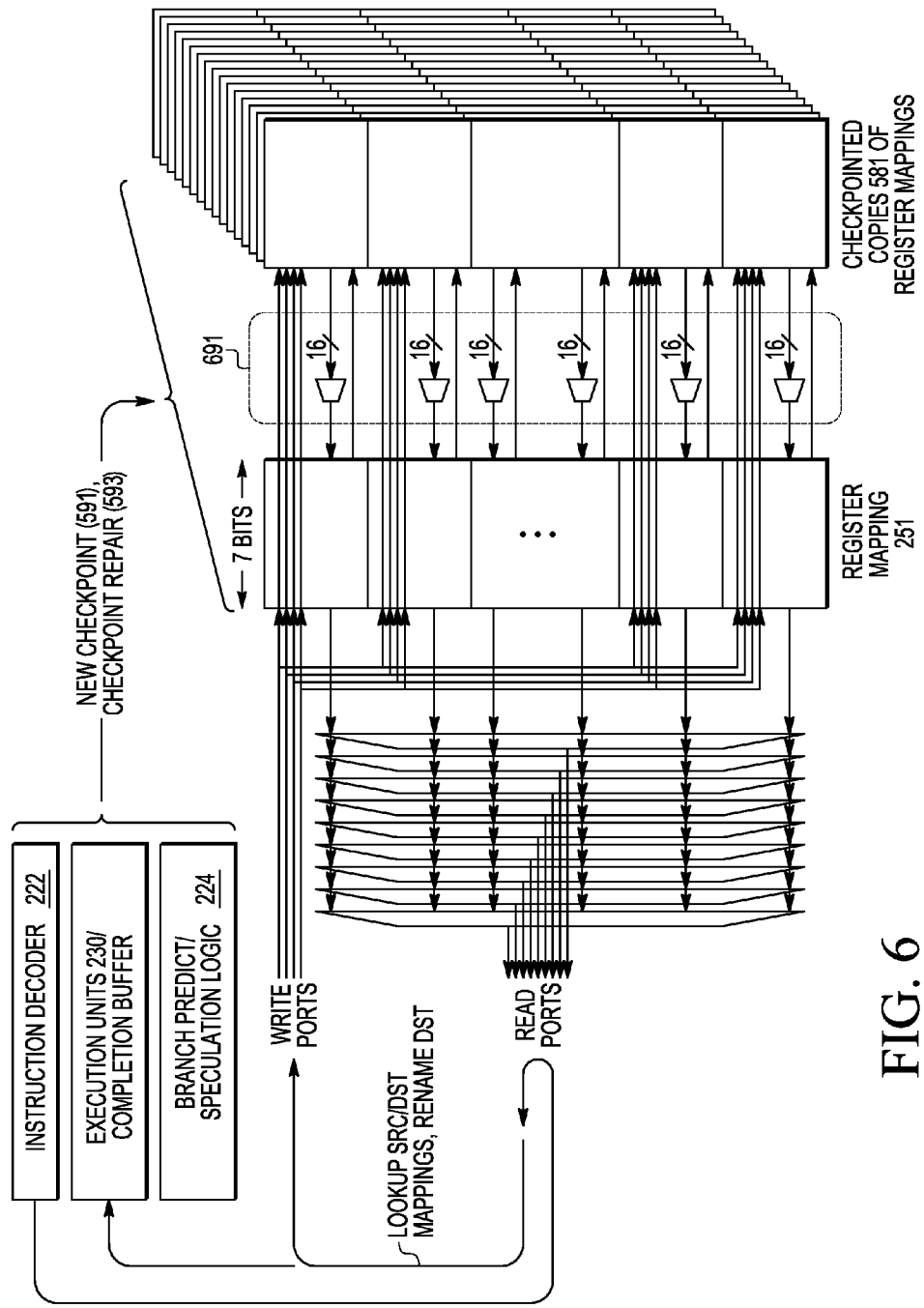
FIG. 6 is a block diagram that illustrates data and control flows into and out of a checkpoint store for an architectural-to-physical register mapping table used by a processor in accordance with one or more embodiments of the present invention(s).

For purposes of description, it has been useful to depict (as in FIG. 5) the portion (581) of checkpoint store 270 used to store check pointed copies of register mappings in close illustrative association with other portions of checkpoint store 270, including the portion (582) used to store checkpoint associated read pointer values. Nonetheless, it will be appreciated that integrated circuit implementations in accordance with some embodiments of the present invention(s) may define storage arrays in a manner that advantageously facilitates transfer of mapping states between an active architectural-to-physical mapping table (register mapping store 251) and check pointed copies (581) of states represented in such a mapping table. FIG. 6 illustrates one such implementation with emphasis on multiplexing and data paths between mapping store 251 and check pointed copies (581) thereof. Specifically, FIG. 6 depicts an implementation in which write through technique may be employed for register renamings introduced into mapping store 251 to efficiently accumulate into storage plane of checkpointed copy storage 581 those renamings that will define content of a new checkpoint (591) image when saved. Likewise with respect to checkpoint repair (593), multiplexing logic 691 is introduced in a restore data path between the storage planes of checkpointed copy storage 581 and mapping store 251 to provide a mechanism whereby each of the architectural-to-physical mappings of a selected checkpoint may be efficiently restored.

Operational Flow Examples

Figure 7:
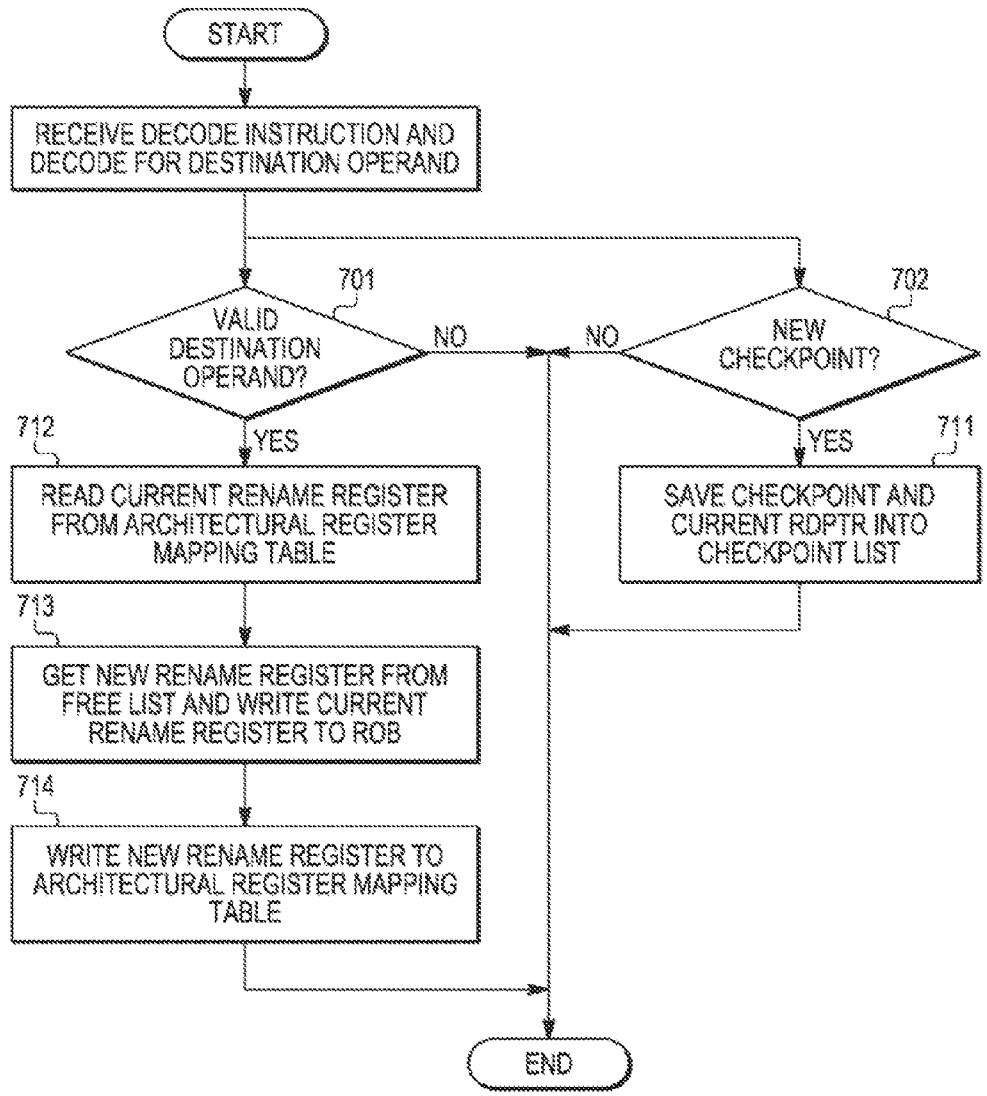
FIG. 7 is a flow chart illustrating decode stage operations in accordance with one or more embodiments of the present invention(s) to update (in a manner consistent with a new destination register renaming or a new checkpoint) the information represented in an architectural-to-physical register mapping table and in free-list and register reorder buffer fields of circular buffer and used by a renaming logic.
Figure 8:
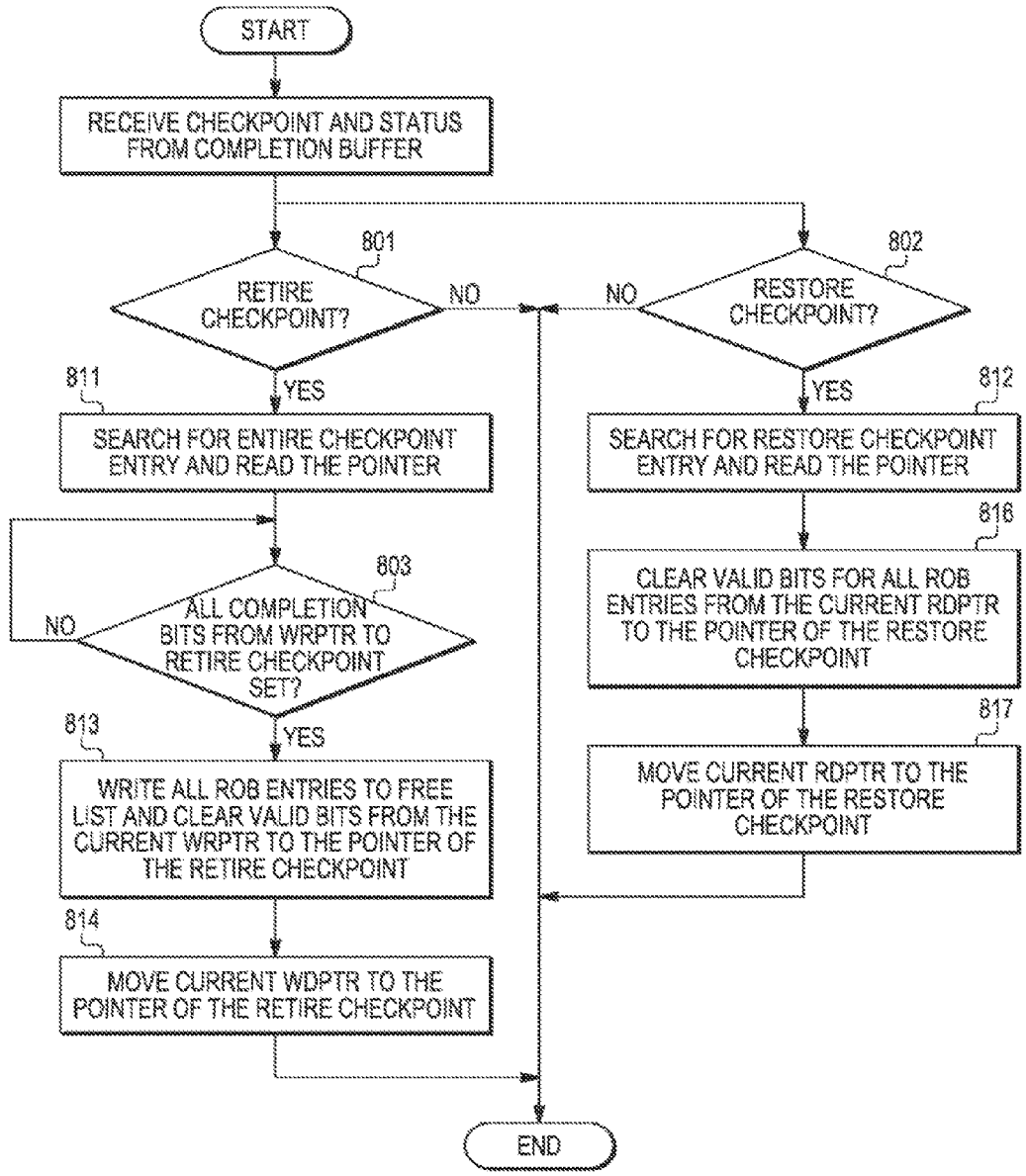
FIG. 8 is a flow chart illustrating completion stage operations in accordance with one or more embodiments of the present invention(s) to update (in a manner consistent with a retiring or restoring a checkpoint) the information represented in an architectural-to-physical register mapping table and in free-list and register reorder buffer fields of circular buffer and used by a renaming logic.

Finally, FIGS. 7 and 8 illustrate renaming and checkpoint operations in accordance with some embodiments of the present invention(s). Although the operational sequences illustrated and described correspond to operations described herein relative to structures presented in one or more of FIGS. 2-6, it will be understood (based on the exemplary descriptions herein) that similar operational sequences may be performed using different underlying structures or implementations thereof without, in some cases, departing from the spirit and scope of the present invention(s).

FIG. 7 is a flow chart illustrating decode stage operations (e.g., decode D0 stage operations, recall FIG. 3, of a processor 12, recall FIG. 2) to update (in a manner consistent with a new destination register renaming or a new checkpoint) the information represented in an architectural-to-physical register mapping table (such as that illustrated and described herein as mapping store 251) and in free-list and register reorder buffer fields of a buffer (e.g., 260) used by a renaming logic of a processor. For example based on decoded instruction and/or destination operand, the method determines (701, 702) whether the instruction constitutes a "new checkpoint" instruction or includes a destination operand for renaming. If the instruction constitutes a "new checkpoint" instruction, current architectural-to-physical mappings are saved (711) together with a copy of a current index into free list and reorder buffer structure(s) into a checkpoint store. In some realizations of the method, architectural-to-physical mappings in mapping store 251 and a current value of a read pointer RDPTR into a circular buffer implementation of a combined free list/ROB store 260 are committed to a storage plane of checkpointed copy storage 581 (recall FIGS. 4, 5 and 6).

If the decoded instruction includes a valid destination operand target (i.e., an architectural register identifier), a current renaming (if any) for the destination operand is read (712) from the current architectural-to-physical mapping and stored (713) in a reorder buffer entry, while a new renaming (i.e., a new architectural-to-physical mapping) is obtained (713) from the free list and written (714) to a table that stores the current set of architectural-to-physical mappings. In some realizations of the method, mapping store 251 is the source and target for the aforementioned read (712) and write (714) operations, and corresponding fields of particular entry of a circular buffer implementation of a combined free list/ROB store 260 are (i) the respective source of the new renaming and (ii) the storage for the now prior renaming of the architectural register identifier that constitutes the destination operand (again recall FIGS. 4, 5 and 6).

FIG. 8 is a flow chart illustrating completion stage operations performed in a processor (e.g., processor 12, recall FIG. 2) to update in a manner consistent with a checkpoint retirement and repair operations (recall e.g., FIG. 3 and the accompanying description) to manipulate and transform the information represented in an architectural-to-physical register mapping table (such as that illustrated and described herein as mapping store 251), in checkpoint storage (such as that illustrated and described herein as checkpoint store 270) and in free-list and register reorder buffer fields of a buffer (e.g., 260) used by a renaming logic of a processor. For example, based on checkpoint information and status received or retrieved from a completion buffer, the method determines (801, 802) whether the information and status calls for "checkpoint retirement," "checkpoint repair" or neither. If the information and status is indicative of "checkpoint retirement," the method searches a checkpoint store (e.g., a content addressable tag portion of checkpoint store 270) for the corresponding checkpoint entry and (at step 811) reads an associated index into a free list and reorder buffer structure (e.g., a previously checkpointed value of a read pointer RDPTR index into a circular buffer implementation of a combined free list/ROB store 260). Once all entries in the reorder buffer from a current write pointer and to the to-be-retired checkpoint are marked as completed (see predicate 803), those reorder buffer are written (813) to the free list and the current write pointer (or other tail-end identifier) is moved (814) or advanced past entries of the now retired checkpoint.

If the information and status is indicative of "checkpoint repair" or restoration, the method searches a checkpoint store (e.g., a content addressable tag portion of checkpoint store 270) for the corresponding checkpoint entry and (at step 812) reads an associated index into a free list and reorder buffer structure (e.g., a previously checkpointed value of a read pointer RDPTR index into a circular buffer implementation of a combined free list/ROB store 260). Completion indications already set for any entries in the reorder buffer from a current read pointer to the retrieved index for the to-be-restored-to checkpoint are cleared (816) and the current read pointer (or other head-end identifier) is restored (817) to correspond to the retrieved index.

Other Embodiments

Although the invention is described herein with reference to specific embodiments, various modifications and changes can be made without departing from the scope of the present invention as set forth in the claims below. For example, while we have described techniques in the context of certain illustrative speculative execution strategies and instruction set architecture related design choices, our techniques are not necessarily limited thereto.

Embodiments of the present invention may be implemented using any of a variety of different information processing systems. Accordingly, while FIGS. 1 and 2, together with their accompanying description relate to exemplary data processing system and processor architectures, these exemplary architectures are merely illustrative. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, system and apparati that implement the present invention are, for the most part, composed of electronic components, circuits and/or code (e.g., software, firmware and/or microcode) known to those skilled in the art and functionally described herein. Accordingly, component, circuit and code details are explained at a level of detail necessary for clarity, for concreteness and to facilitate an understanding and appreciation of the underlying concepts of the present invention. In some cases, a generalized description of features, structures, components or implementation techniques known in the art is used so as to avoid obfuscation or distraction from the teachings of the present invention.

In general, the terms "program" and/or "program code" are used herein to describe a sequence or set of instructions designed for execution on a computer system. As such, such terms may include or encompass subroutines, functions, procedures, object methods, implementations of software methods, interfaces or objects, executable applications, applets, servlets, source, object or intermediate code, shared and/or dynamically loaded/linked libraries and/or other sequences or groups of instructions designed for execution on a computer system.

All or some of the program code described herein, as well as any software implemented functionality of information processing systems described herein, may be accessed or received by elements of an information processing system, for example, from computer readable media or via other systems. In general, computer readable media may be permanently, removably or remotely coupled to an information processing system. Computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and non-transitory media used as storage incident to data transmission or receipt of a data transmission via computer networks, point-to-point telecommunication equipment, carriers, signals, etc.

Finally, the specification and figures are to be regarded in an illustrative rather than a restrictive sense, and consistent with the description herein, a broad range of variations, modifications and extensions are envisioned. Any benefits, advantages, or solutions to problems that are described herein with regard to specific embodiments are not intended to be construed as a critical, required, or essential feature or element of any or all the claims.

What is claimed is:

1. A processor comprising:
a renaming store coupled to provide instruction dispatch logic with physical register identifiers mapped from architectural register identifiers in correspondence with a current register renaming state;
storage for an array of entries each including a pair of corresponding free-list and register reorder buffer fields, the array storage coupled to the renaming store to, coincident with dispatch of each successive instruction that specifies a destination register, (i) supply a physical register identifier obtained from the free-list field of a next entry at a head-end thereof to the renaming store as a next physical register renaming target for the destination register and (ii) receive from the renaming store and store into the register reorder buffer field of the next entry a current physical register renaming target for the destination register; and
storage for a plurality of checkpoint images of the renaming store each capable of storing for a given checkpoint, both (i) a then current register renaming state and (ii) a corresponding head-end read pointer value for indexing into the array storage at an entry that, at the given checkpoint, was the then next entry at the then head-end of the array.

2. The processor of claim 1, further comprising:
the instruction dispatch logic, wherein the instruction dispatch logic is configured to dispatch the successive instructions in program order, and
wherein, for an architectural register destination of each of the instructions successively dispatched in program order, the array storage is configured to supply a respective physical register renaming target from the free-list field of the corresponding next entry thereof.

3. The processor of claim 1, further comprising:
a plurality execution units configured to execute respective ones of the successively dispatched instructions, the execution units coupled to, in correspondence with completion of a particular instruction executed thereby, mark as valid the reorder buffer field of the array storage entry that corresponds thereto.

4. The processor of claim 3,
wherein the instruction dispatch logic is configured to dispatch the successive instructions in program order, and
wherein the execution units are configured to complete the dispatched instructions generally out of program order and store results thereof to the corresponding physical register renaming targets.

5. The processor of claim 3, further comprising:
a register file,
wherein results of the completed instructions are stored in physical registers of the register file generally out of program order and retired to architectural state in correspondence with checkpoint delimited sets of entries of the array storage.

6. The processor of claim 1,
wherein the plurality of checkpoint images allow for up to a corresponding plurality of in-flight checkpoints without imaging content of underlying physical registers of the register file.

7. The processor of claim 1, further comprising:
a data path for saving in a checkpoint image storage, and in correspondence with checkpoint instruction or signal, a checkpoint image of both (i) an architectural-to-physical mapping table and (ii) a corresponding head-end read pointer value for indexing into the array storage at an entry that, at the given checkpoint, is the next entry at the head-end of the array storage.

8. The processor of claim 1, further comprising:
a data path for restoring, in correspondence with a branch misprediction or exception, a checkpoint image of both (i) an architectural-to-physical mapping table and (ii) a corresponding head-end read pointer value for indexing into the array storage at an entry that, at the given checkpoint, was the then next entry at the then head-end of the array storage.

9. The processor of claim 1,
wherein the array storage is implemented as a circular buffer; and
wherein during operation of the processor, for each entry between the head-end and a tail-end of the circular buffer, the register reorder buffer field encodes a register identifier for a physical register renaming target to be restored in an architectural-to-physical mapping table upon retirement of the corresponding, unretired instruction.

10. The processor of claim 9,
wherein entries of the circular buffer, including the register reorder buffer fields, are as numerous as physical registers available to the processor as renaming targets.

11. The processor of claim 9,
wherein a single head-end read pointer is sufficient to index the free list and register reorder buffer fields in correspondence with dispatch of successive instructions.

12. The processor of claim 9,
wherein a single tail-end write pointer is sufficient to index the free list and register reorder buffer fields in correspondence with checkpoint retirements.

13. A method comprising:
decoding a first instruction to determine an architectural register that is a destination of the instruction;
in correspondence with the instruction decoding, indexing into a next entry at a head-end of storage for an array of entries that each include a pair of corresponding free-list and register reorder buffer fields;
based on a current state of an architectural-to-physical register mapping table,
(a) obtaining a first identifier for a first physical register to which the destination has been mapped and storing the obtained first identifier to the reorder buffer field of the indexed-into next entry at the head-end of the array storage;

(b) obtaining from the free-list field of the indexed-into next entry at the head-end of the array storage a second identifier for a second physical register as a next physical register renaming for the destination and storing the obtained second identifier to the architectural-to-physical register mapping table as a next physical register to which the destination is mapped;
dispatching the first instruction for execution with source register targets renamed in accordance with the current state of the architectural-to-physical register mapping table and with the next physical register renaming as destination target thereof;
decoding next successive instructions in program order to determine respective architectural registers that are destinations thereof and performing with respect to the successive instructions, and based on then current states of the architectural-to-physical register mapping table and array storage, the indexing, the (a) obtaining, the (b) obtaining and the dispatching; and
responsive to a checkpoint event, saving a checkpoint image of both (i) a current register renaming state and (ii) a corresponding read pointer value for indexing into the array storage at an entry that, at the checkpoint, is the next entry at the current head-end of the array storage.

14. The method of claim 13,
wherein the indexing to corresponding free-list and register reorder buffer fields is performed using a same read pointer; and
wherein further indexing into the array storage in connection with checkpoint creation or retirement operations on corresponding free-list and register reorder buffer fields is likewise performed using a same checkpoint or write pointer.

15. The method of claim 13,
wherein the dispatching of the first and successive instructions is in program order, and
wherein, for the architectural register destination of each of the instructions dispatched in program order, the array storage supplies a respective physical register renaming target from the free-list field of a corresponding next entry thereof.

16. The method of claim 13, further comprising:
executing the dispatched first and successive instructions; and
in correspondence with completion of respective ones of the dispatched first and successive instructions, marking as valid the reorder buffer field of the corresponding array storage entry.

17. A method comprising:
maintaining as an array storage a coordinated free-list and reorder buffer data structure that represents, in the free-list, physical register renaming targets allocable to instruction destinations and, in the reorder buffer, presently allocated physical register renaming targets reclaimable upon retirement of or restoration to a corresponding checkpoint;
responsive to a checkpoint event, saving a checkpoint image of both (i) a current register renaming state of an architectural-to-physical mapping table and (ii) a corresponding read pointer value for indexing into the array storage at an entry that, at the checkpoint, is at a current head-end of the array storage; and
restoring, in correspondence with a branch misprediction or exception, both a checkpoint image of the architectural-to-physical mapping table and a corresponding head-end read pointer value for indexing into the array storage at an entry that, at the given checkpoint, was the then next entry at the then head-end of the array storage.

18. The method of claim 17, further comprising, in correspondence with dispatch of each successive instruction that specifies a destination register:

retrieving from the architectural-to-physical mapping table a current physical register renaming target for the destination register and storing the retrieved current renaming target into the register reorder buffer at the current head-end thereof;

supplying a physical register identifier obtained from the free-list at the current head-end thereof to the architectural-to-physical mapping table store as a next physical register renaming target for the destination register; and advancing a read pointer that identifies the current head-end of the coordinated free-list and reorder buffer data structure.

\* \* \* \* \*